United States Patent
Baldwin

[19]

[11] Patent Number: 5,813,641
[45] Date of Patent: Sep. 29, 1998

[54] CLAMP BRACKET

[76] Inventor: David Baldwin, 80 Island Cir., Sarasota, Fla. 34242

[21] Appl. No.: 724,141

[22] Filed: Sep. 30, 1996

[51] Int. Cl.$^6$ ................................................. A47B 96/06
[52] U.S. Cl. ........................................ 248/223.41; 248/300
[58] Field of Search .................... 248/223.41, 223.51, 248/224.61, 300, 205.1, 297.21

[56] References Cited

U.S. PATENT DOCUMENTS

| | | | |
|---|---|---|---|
| 5,356,104 | 10/1994 | Rosenberg et al. | 248/223.41 |
| 5,386,959 | 2/1995 | Laughlin et al. | 248/205.1 |
| 5,598,785 | 2/1997 | Zaguroli, Jr. | 248/223.41 X |

Primary Examiner—Ramon O. Ramirez
Attorney, Agent, or Firm—Charles J. Prescott

[57] ABSTRACT

A removable clamp bracket for supporting an object from an elongated channel member which has spaced grooves formed in one surface thereof such as may typically be used in screened lanai and swimming pool cage enclosures. The clamp bracket clampingly and lockably engages with the grooves for support without the need for altering or drilling the channel member in any way and may be easily repositioned at any point along the length of the channel member as desired. Several examples of object engagement adaptations are also shown.

9 Claims, 3 Drawing Sheets

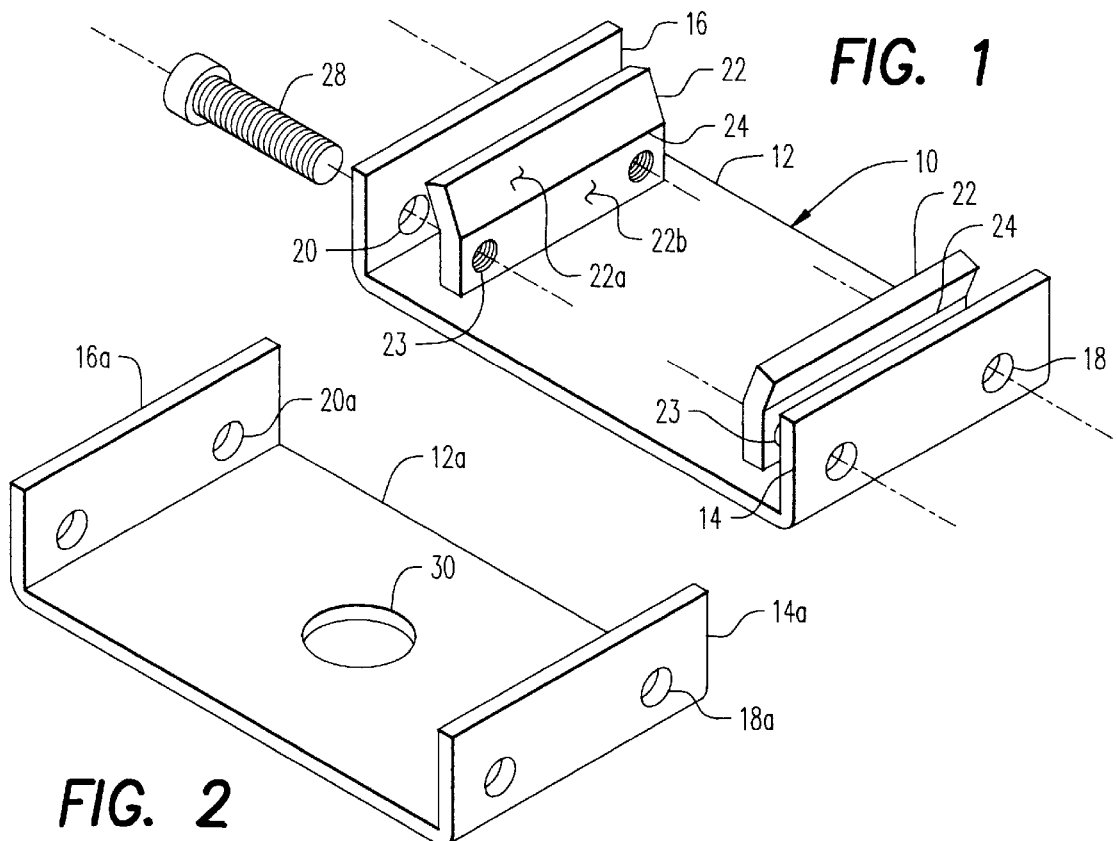
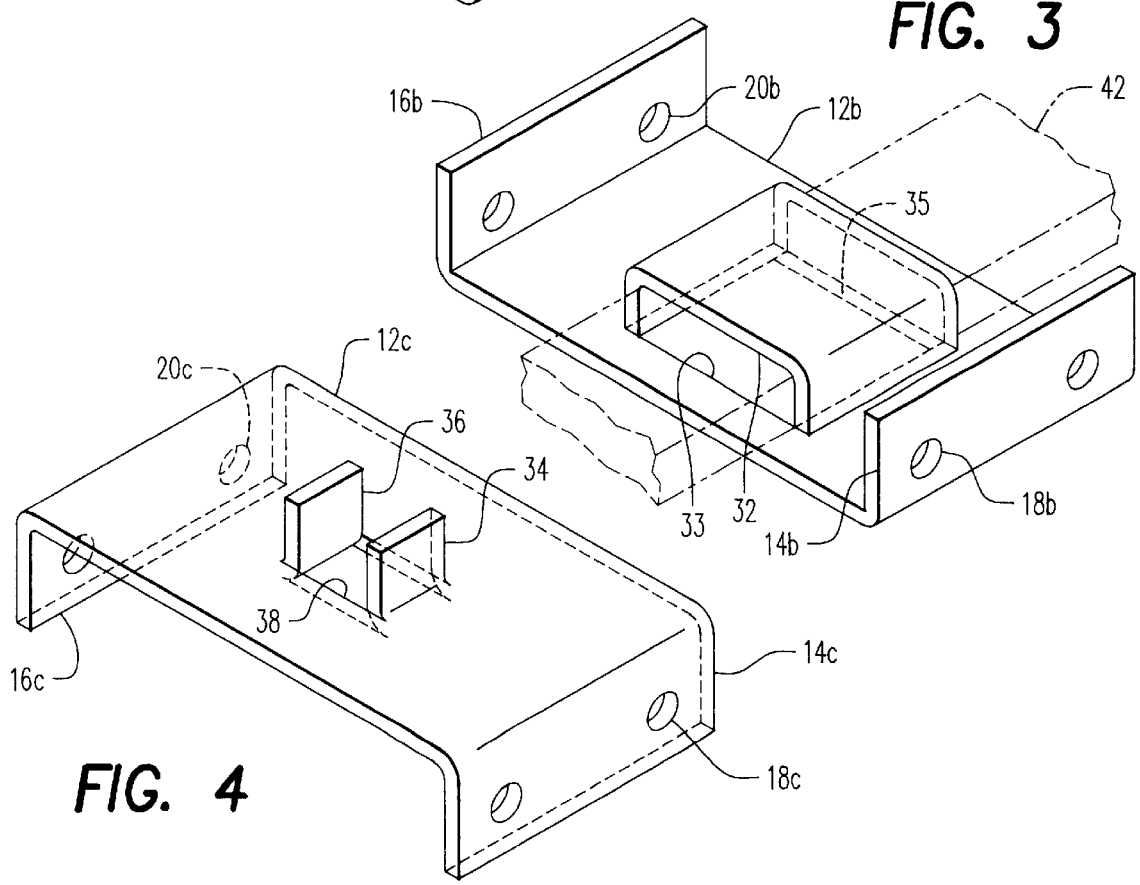

CLAMP BRACKET

BACKGROUND OF THE INVENTION

1. Scope of Invention

This invention relates generally to small devices attached or attachable to a support member for supporting an object, and more particularly to a clamp device for supportive engagement to a rectangular grooved channel member.

2. Prior Art

Screened swimming pool cages, lanai structures and the like are generally fabricated using rectangularly sectioned channel members formed of thin wall aluminum extrusions. These channel members include longitudinal spaced grooves on at least one surface, and typically on opposing surfaces which are coextensive with the channel member and are utilized primarily on an outwardly facing surface to supportively engage with screening enclosure material held in place with an elastomeric bead being forced into each groove with an edge of the screen material.

Such a screen enclosure typically includes a plurality of spaced upright channel members forming the wall structure and horizontally and angular disposed spaced channel members forming the top portion of the enclosure. The support structure formed by these channel members in this fashion is sufficient in strength to also be utilized to support various objects such as flower pots, equipment racks and brackets, lighting and stereo equipment, security system components and the like.

However, to attach any of these various utility and decorative accessories, the channel member being utilized would typically have to be modified as by drilling or tapping so as to receive some sort of fastener to attach the object, or intermediate bracketry for supporting the object, to the channel member.

Applicant searched unsuccessfully to locate a prior art device which would securely engage with the grooved channel members of these screened lanai and swimming pool structures without the objectionable marring and alteration of the channel members for support. Examples of patented prior art devices of which applicant is aware are as follows:

| Havener | 3,606,223 |
| Cumber | 3,804,359 |
| Swain | 4,183,487 |
| Miller, et al. | 4,725,030 |

However, applicant was unsuccessful in locating either a patented or marketed prior art device which would attach directly to one of these channel members without the need for any such modification or alteration, drilling, tapping, screwing, etc. On that basis, the present invention will soon be available to the marketplace to satisfy this long felt need in the marketplace by providing an inexpensively manufactured and priced device in a broad variety of forms which may be easily connectable at any point onto one of the grooved channel members of a screened enclosure.

BRIEF SUMMARY OF THE INVENTION

This invention is directed to a removable clamp bracket for supporting an object from an elongated channel member which has spaced grooves formed in one surface thereof such as may typically be used in screened lanai and swimming pool cage enclosures. The clamp bracket clampingly and lockably engages with the grooves for support without the need for altering or drilling the channel member in any way and may be easily repositioned at any point along the length of the channel member as desired. Several examples of object engagement adaptations are also shown.

It is therefore an object of this invention to provide an easily installable, easily adjustable and removable clamp bracket which will, by clamping action above, attach to an elongated grooved channel member of a typical screened enclosure without the need for modifying or altering the channel member in any fashion.

It is still another object of this invention to provide an easily installable and easily repositionable clamp bracket which provides as its only means for clamping securement to an elongated grooved channel member an unmarring clamping arrangement which is dependent upon interengagement with the grooves in the channel member.

It is yet another object of this invention to provide a clamp bracket which is supportively engageable by clamping means only to a grooved channel member and provides broad versatility with respect to adaptations for supportive engagement with various objects to be held above ground by the channel member.

In accordance with these and other objects which will become apparent hereinafter, the instant invention will now be described with reference to the accompanying drawings.

BRIEF DESCRIPTION OF THE DRAWINGS

FIG. 1 is a perspective view of a broad embodiment of the invention.

FIG. 2 is a perspective view of a modified form of the main member of the device as shown in FIG. 1 absent groove-engaging member (22) for clarity.

FIG. 3 is another modification to the main member of the clamp bracket shown in FIG. 1 absent groove-engaging member (22) for clarity.

FIG. 4 is still another modification to the main member of the clamp bracket shown in FIG. 1 absent groove-engaging member (22) for clarity.

DETAILED DESCRIPTION OF THE INVENTION

Figure 5:
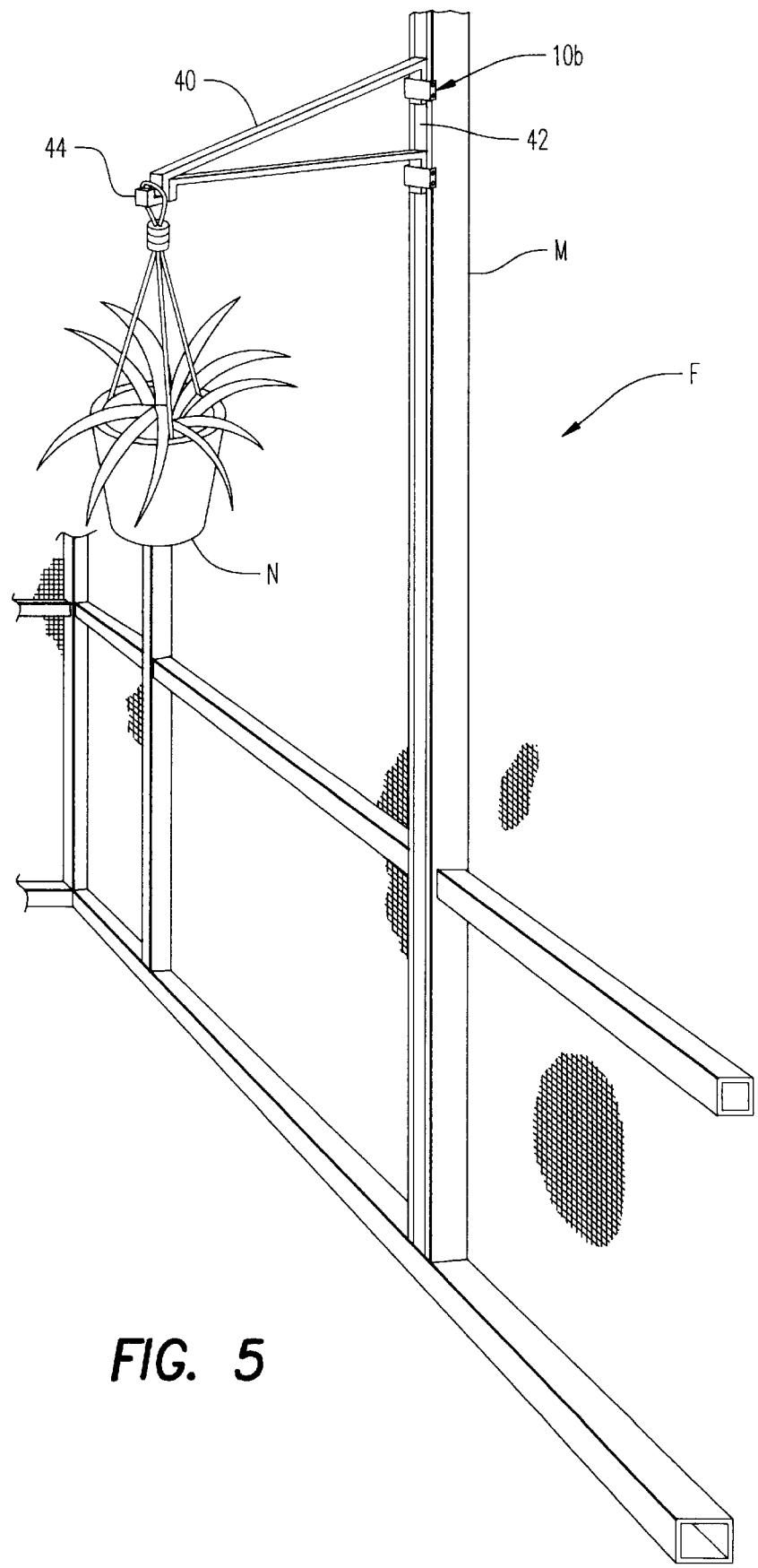
FIG. 5 is a perspective view of the embodiment of the clamp member of FIG. 1 utilizing the main member embodiment 12a of FIG. 2 in use supporting a plant and supportive bracket.

Referring now to the drawings, various embodiments of the invention are shown in FIGS. 1 to 4. In FIG. 1, an entire clamp bracket assembly is shown generally at numeral 10 and includes a main bracket member 12, two groove engaging members or clips 22 and threaded fasteners 28, two per each end of the clamp bracket 10.

The main bracket member 12 is fabricated preferably of thirteen (13) gage galvanized steel and is generally U-shaped having an elongated main or central portion and generally orthogonally disposed end portions 14 and 16. Each of the end portions 14 and 16 include a pair of spaced holes 18 and 20, respectively, drilled therethrough.

Each of the groove-engaging members or clips 22 are also formed of preferably thirteen (13) gage galvanized steel having a central bend or crease 24 longitudinally thereof so as to cant the two halves 22a and 22b thereof as shown. A pair of spaced threaded apertures 23 are formed through one portion 22b of each groove-engaging member 22 having a spacing equal to that of holes 18 and 20. A threaded fastener 28 is passed through each of the holes 18 and 20 for threadable engagement into threaded holes 23 so as to adjustably maintain the orientation and spacing between the end portions 14 and 16 and the corresponding groove-engaging member 22.

In FIG. 2, an alternate embodiment of the main member 12a is there shown. In this embodiment 12a, a central aperture 30 has been formed centrally through the central portion for use in engaging an object for support. This embodiment 12a also includes apertures 18 and 28 formed through the end portions 14 and 16, respectively, as previously described.

In FIG. 3, another embodiment of the main bracket member 12b is there shown having a small U-shaped object support member 32 which is sheer formed by first cutting the central portion of the main bracket 12b along spaced cut lines 33 and 35 and then stamping between the cut lines 33 and 35 to form a protrusion into the object support member 32. This object support member 32, in conjunction with the central portion of the main bracket member 12b, define a support slot or hole for receiving a rectangular bar portion 42 of an object support frame such as that shown at 40 in FIG. 5 as described herebelow. This embodiment 12b also includes generally orthogonally disposed end portions 14b and 16b each having a pair of spaced holes 18b and 20b, respectively, formed therethrough for receiving threaded fasteners 28 as previously described.

Referring to FIG. 4, still another embodiment of the main bracket member 12c is there shown. In this embodiment 12c, which is identical in overall configuration to main member 12 of FIG. 1, including end portions 14c and 16c and holes 18c and 20c, respectively, a pair of spaced object mounting ears 34 and 36 are formed by piercing or punching an "H"-shaped cut through the central portion and then deforming ears 34 and 36 laterally therefrom to leave aperture 38. Note that these mounting ears 34 and 36 extend in an opposite direction away from end portions 14c and 16c to provide an outwardly-extending object support away from a channel member to which the device is to be connected.

Figure 6:
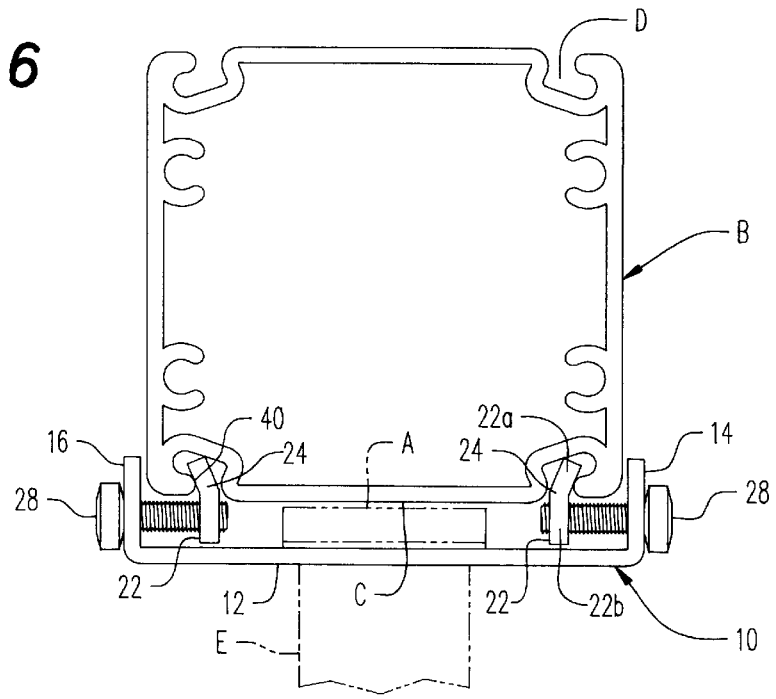
FIG. 6 is an end view of a conventional grooved channel member with the invention as shown in FIG. 1 clampingly engaged thereto.

In FIG. 6, the essence of the invention is there depicted. The embodiment of the invention 10 as described in FIG. 1 is there shown clampingly engaged to a rectangular aluminum extruded channel member B. The channel member B includes interior grooves which are utilized for structural connection to cross members or channel member extensions and the like and are not part of this invention. A pair of grooves D are formed into opposing surfaces and are coextensive with the channel member B. In normal use, each of these grooves D is generally shaped to receive an edge portion of screen material which is forced into the groove D and held in position by a length of elastomeric rope.

However, as seen in FIG. 6, these grooves D which are unused for screen engagement and support on an opposite surface C from that used for such purpose are here utilized for clamping supportive engagement with each groove-engaging member 24, the angled portion extending into the groove D as shown. With the main member 12 positioned as shown spaced slightly from the surface C and with end portions 14 and 16, being spaced apart slightly wider than the width of surface C are positioned adjacent the side corners at either end of surface C of the channel member B. When so positioned, as threaded fasteners 28 are tightened, the groove-engaging members 22 are drawn toward each of the corresponding end portions 14 and 16 so as to squeezably urge each groove-engaging member 22 against surface 40. When tightening of fasteners 28 is sufficient, the squeezable clamping engagement between the groove-engaging members 22 and surface 40 of each groove D is frictionally sufficient to prevent longitudinal of the clamp bracket 10 with respect to grooves D. Moreover, the angled portion 22a about central crease 24 of each groove-engaging member 22 lockably engages into the groove D to prevent a separation therebetween.

The clamp bracket 10 being thus lockably engageable into grooves D of channel member B as described, various objects or object support members may be lockably engageable such as elongated bar member A positioned between the main member 12 and the surface C or connected permanently or attachable as at E to the outer surface of the main bracket 12.

In FIG. 5, a portion of a screened lanai enclosure is shown generally at F and includes a typical upright channel member M having a cross section similar to that shown in FIG. 6. One embodiment of the invention 10b is utilized in tandem fashion to support bracket 40. Each of these clamp brackets 10b is generally similar to that shown in FIG. 1 except that the main body 12b of FIG. 3 has been utilized so that the upright bar 42 is trapably engaged between the object support bracket 32 and the opposing surface of the main bracket member 12b. Alternately, this arrangement may be made permanent as by welding and the like. With bracket 40 so secured, an object such as a plant N may be connected at 44 for decorative supportive engagement thereby.

Figure 7:
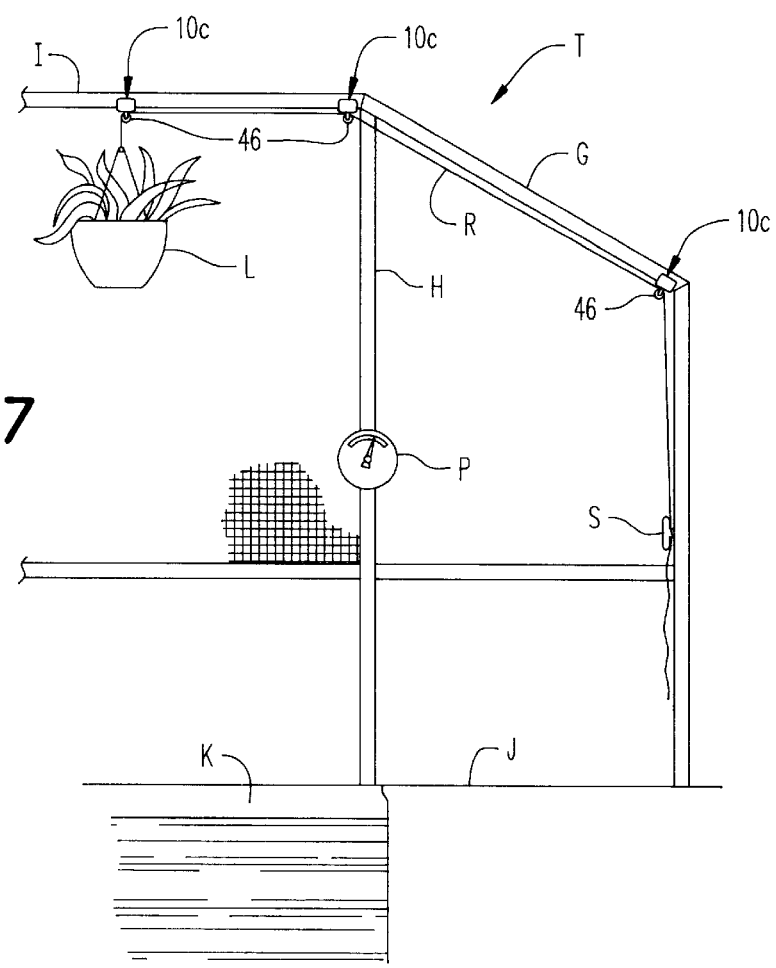
FIG. 7 is a side elevation view of an object support system which utilizes the main member shown 12c in FIG. 4 in conjunction with the clamp bracket of FIG. 1.

Referring to FIG. 7, a typical screened swimming pool cage enclosure is shown generally at T and includes upright channel members such as shown at H, angular channel members G and horizontal members I. Each of these frame members has a channel section similar to that shown in FIG. 6 wherein pairs of grooves D are disposed into opposing surfaces of each channel member B. Another embodiment of the invention 10c is utilized in conjunction with main bracket member 12c of FIG. 4 for damping engagement along the channel members G and I as shown. These clamp brackets 10c include rollers 46 which are fixed for rotation only between support ears 34 and 36 of FIG. 4. By this arrangement, a length of rope R extends over each of the rollers 46, one end of the rope R being connected to support an object such as a hanging plant arrangement L, the other end of the rope R being lockably secured to anchor S. Thus, by releasing the rope R from anchor S, the plant L may be lowered for watering and other needed attention.

Although examples of the utility of the present invention have been described by a few example embodiments, a virtually limitless number of additional variations are within the scope of this invention so that objects or components of sport accessories, security, audio-related and lighting-related objects and the like may be supported by one embodiment of the clamp brackets shown in FIGS. 1 to 4. In each instance, no screws, adhesives, threaded fasteners into the channel members and the like are required. Only the squeezable clamping and locking force between the groove-engaging members and the tightenable threaded fasteners 28 is required for a complete and secure engagement with the conventional grooved channel members of a screened enclosure and the like.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A removable, repositionable clamp bracket for clamping engagement only with an elongated channel member having side surfaces and two spaced parallel grooves extending along and into a front surface of the channel member, said clamp bracket comprising:

a generally U-shaped main member having an elongated central portion and substantially orthogonally extending end portions spaced apart slightly greater than a width of the one surface of the channel member;

two groove engaging members;

threaded means for adjustably positioning one said groove engaging member in spaced opposing relation with respect to each said end portion, said groove engaging members being spaced apart a distance generally equal to that of the grooves whereby, when said main member is positioned in close proximity to the one surface of the channel member, said groove engaging members extend into the grooves and clampingly engage thereagainst when said threaded means are tightened against the side surfaces.

2. A removable, repositionable clamp bracket as set forth in claim 1, further comprising:

a U-shaped object support member connected to said main member centrally on said central portion in opposing orientation with respect to said main member whereby an elongated generally rectangular support hole open at each end thereof is formed between said object support member and said main member;

said support hole adapted to supportively receive an elongated bar of an object to be supported by said clamp bracket.

3. A removable, repositionable clamp bracket as set forth in claim 1, further comprising:

a pair of spaced substantially parallel support ears extending centrally from said central portion in a direction opposite from said end portions;

said pair of support bars adapted for supportive connection with an object to be supported by said clamp bracket.

4. A removable, repositionable clamp bracket as set forth in claim 1, further comprising:

an object mounting hole formed centrally through said central portion which facilitates supportive engagement with an object to be supported by said clamp bracket.

5. A removable clamp bracket comprising:

a generally U-shaped main member having an elongated central portion and substantially orthogonally extending end portions;

a groove engaging member held in close spaced generally parallel relation to, and generally coextensive with, an inner surface of each said end portion;

threaded fastener means between each said groove engaging member and a corresponding said end portion for holding and adjustably positioning each said groove engaging member with respect to the corresponding said end portion whereby said clamp bracket is clampingly engagable to a support member having two spaced parallel grooves in one surface thereof when said groove engaging members are positioned into the grooves and said threaded fastener means are tightened.

6. A removable, repositionable clamp bracket for supporting an object by clamping engagement only with an elongated channel member having side surfaces and two spaced parallel grooves extending along and into a front surface of the channel member, said clamp bracket comprising:

a generally U-shaped main member having an elongated central portion and substantially orthogonally extending end portions spaced apart slightly greater than a width of the one surface of the channel member;

two groove engaging members;

threaded means for adjustably positioning one said groove engaging member in spaced opposing relation to each said end portion, said groove engaging members being spaced apart a distance generally equal to that of the grooves whereby, when said main member is positioned in close proximity to the one surface of the channel member, said groove engaging members extend into the grooves and dampingly engage thereagainst when said threaded means are tightened against the side surfaces;

means for supportive engagement with the object.

7. A removable, repositionable clamp bracket as set forth in claim 6, wherein:

said means for supportive engagement includes a U-shaped support member connected in opposing orientation with respect to said main member to said central portion in a same direction, whereby an elongated generally rectangular support hole is formed;

said support hole adapted to supportively receive an elongated bar of an object to be supported by said clamp bracket.

8. A removable, repositionable clamp bracket as set forth in claim 6, wherein:

said means for supportive engagement includes:

a pair of spaced substantially parallel support ears extending centrally from said central portion in a direction opposite from said end portions;

said pair of support bars adapted for supportive connection with an object to be supported by said clamp bracket.

9. A removable, repositionable clamp bracket as set forth in claim 6, wherein:

said means for supportive engagement includes:

an object mounting hole formed centrally through said central portion which facilitates supportive engagement with an object to be supported by said clamp bracket.

* * * * *